(12) United States Patent
Wang et al.

(10) Patent No.: US 9,813,129 B2
(45) Date of Patent: Nov. 7, 2017

(54) HIERARCHICALLY ELABORATED PHASED-ARRAY ANTENNA MODULES AND FASTER BEAM STEERING METHOD OF OPERATION

(71) Applicants: James Wang, San Marino, CA (US); Chak Chie, Culver City, CA (US)

(72) Inventors: James Wang, San Marino, CA (US); Chak Chie, Culver City, CA (US)

(73) Assignee: TUBIS TECHNOLOGY, Pasadena, CA (US)

( * ) Notice: Subject to any disclaimer, the term of this patent is extended or adjusted under 35 U.S.C. 154(b) by 728 days.

(21) Appl. No.: 14/106,801

(22) Filed: Dec. 15, 2013

(65) Prior Publication Data

US 2014/0210668 A1     Jul. 31, 2014

Related U.S. Application Data

(63) Continuation-in-part of application No. 13/959,542, filed on Aug. 5, 2013.

(60) Provisional application No. 61/757,688, filed on Jan. 28, 2013.

(51) Int. Cl.

| | |
|---|---|
| H01Q 3/00 | (2006.01) |
| H04B 7/06 | (2006.01) |
| H01Q 3/34 | (2006.01) |
| H01Q 3/26 | (2006.01) |
| H01Q 21/00 | (2006.01) |

(52) U.S. Cl.
CPC ......... *H04B 7/0617* (2013.01); *H01Q 3/2605* (2013.01); *H01Q 3/2629* (2013.01); *H01Q 3/34* (2013.01); *H01Q 21/0025* (2013.01); *H04B 7/0665* (2013.01)

(58) Field of Classification Search
USPC .......................... 342/81, 154, 157, 368, 372
See application file for complete search history.

(56) References Cited

U.S. PATENT DOCUMENTS

| | | | | |
|---|---|---|---|---|
| 6,072,994 A | * | 6/2000 | Phillips ................. | G01S 13/767 375/219 |
| 2016/0197660 A1 | * | 7/2016 | O'Keeffe ............... | H01Q 1/246 370/329 |

* cited by examiner

*Primary Examiner* — Dao Phan
(74) *Attorney, Agent, or Firm* — Patentry; Peter Hwang

(57) ABSTRACT

An apparatus substantially updates all the phase shifter values of a phased array antenna by using "global write" to update these parameters to all phased-array transformation circuits simultaneously via a serial bus. Antenna elements, each controlled by a phased-array transformation circuit, are individually configured to transform phase and gain according to a register array. The register array has a local register group and a central register group, the local registers physically placed close in proximity to RF chains which each correspond to an element of array antenna, whereby each set of local registers control an individual antenna element and a central register controlling overall beam steering function. The apparatus is configured to efficiently elaborate phase shift weights into a submodule of a phase array antenna system with low noise and bandwidth.

4 Claims, 10 Drawing Sheets

HIERARCHICALLY ELABORATED PHASED-ARRAY ANTENNA MODULES AND FASTER BEAM STEERING METHOD OF OPERATION

RELATED APPLICATIONS

Applicants claim priority from provisional application 61757688 Efficient Phase Shift Control Apparatus and Method for Hierarchically Distributed Elaboration Within a Phased Array Antenna filed 28 Jan. 2013 which is incorporated by reference in its entirety. The present application is a continuation in part of application serial number 13959542 filed Aug. 5, 2013.

BACKGROUND

A conventional phased-array antenna enables a highly directive antenna beam to be steered toward a single certain direction. The direction of an antenna beam may be controlled by setting the phase shifts of each of the antenna elements in the array. However, to enable higher mobility, the phase shifts must be updated more quickly than conventionally practiced. In addition, cost and space considerations eliminate the obvious deployment of parallel data buses. For sensitive RF circuits and interconnection in an phased-array antenna, it is also necessary to simplify and confine the amount of digital interconnection. Thus it can be appreciated that what is needed is a more efficient way of dissemination of the phase shift control information to a substantial number of phase shifters for an antenna array with a high number of antenna elements and possibly more than one simultaneous target.

SUMMARY OF THE INVENTION

One aspect of the invention is a system which includes a processor circuit for control over an antenna element array by generation of an first operand and a first global write command and a second operand and a second global write command; the processor coupled to a serial bus on a system printed circuit board which conductively transmits operands and commands, the serial bus coupled to a plurality of phase-array transformation (PhAT) circuits, whereby the first operand is stored into each of the plurality of PhAT circuits substantially simultaneously and the second operand is stored into each of the plurality of PhAT circuits substantially simultaneously wherein the operands are generated to direct a beam direction.

An efficient phase control scheme for a phased-array antenna consisting of a number of small submodules (subarrays) is disclosed. Each submodule (subarray) has a digital interface and contains a number of antenna elements and the associated phase shifters. The disclosed phase control scheme requires dissemination of minimum amount of phase control information to the submodules.

A serial bus is used to disseminate the phase shift control information. The serial bus has the advantages of simplicity and reduced volume, routing, and cost over a conventional parallel bus. This is especially true for a phased-array antenna with high number of antenna elements. Minimizing the distribution of information enables a substantially lower bus speed and cost.

An array of registers local to each antenna element of a phased-array antenna contains phase shifter and gain equalizer values. Receiving an address, position, or location within the register array from a directional beam controller determines a beam direction. These values can be preloaded and a specific set of phase shifter and gain equalizer values corresponding to a beam direction indicated by disseminating a pointer. Alternatively, a digital functional logic circuit for each antenna element can determine the required phase shift on the fly by receiving a phase increment broadcast to every antenna element.

An apparatus is configured to efficiently elaborate phase shift weights into a submodule of a phased-array antenna system. Each subarray phase control submodule is uniquely configured to receive and elaborate weights for a submodule of elements to control phase shifters. Major operators and minor operators are received and transformed by an apparatus coupled to a phased-array antenna suitable for a high mobility device. Each submodule determines its own base phase shift weight per its unique configuration. A recursive adder or multiplier applies phase increments to direct an antenna beam by controlling elements within an array subset.

A phased-array antenna panel is constructed from building blocks. These are a plurality of front end modules, mounted to a Printed Circuit Board (PCB).

Each front end module has a plurality of antenna elements coupled to a frontend die. The frontend die is coupled to a phased-array processing die.

A customized and customizable Radio Frequency Integrated Circuit (RFIC) device includes: phased-array processing blocks; phase-shifters, combiners, splitters, gain equalizers, buffer amplifiers, and a digital signal control and interface circuit.

A register array in each RFIC is grouped into a local register group and a central register group, the local registers physically placed close in proximity to RF chains which each correspond to an element of array antenna, whereby each set of local registers control an individual antenna element and a central register controlling overall RFIC function.

The system provides several choices for configuring the antenna array. A lookup method determines antenna element phase and gain settings from storage or a computation method determines antenna element phase and gain settings. They may be used separately or combined for corner cases.

The method of operation for the apparatus includes several alternatives explicated below for controlling slave RFIC devices in an antenna array.

The details of one or more embodiments of the invention are set forth in the accompanying drawings and the detailed disclosure below. Other features, objects, and advantages of the invention will be apparent from the description and drawings, and from the claims.

BRIEF DESCRIPTION OF FIGURES

The purpose of the accompanying figures is to aid in the appreciation of the subject matter without clutter or limitation. While the illustrations of 2 by 2, 4 by 4, or 16 element modules are intended to support the understanding of the reader, it can be appreciated that the disclosed economies are even greater for a much larger array of modules and submodules. Thus the discussion and claims are not limited to the values or numbers of elements shown wherein:

DETAILED DISCLOSURE OF EMBODIMENTS

Figure 1:
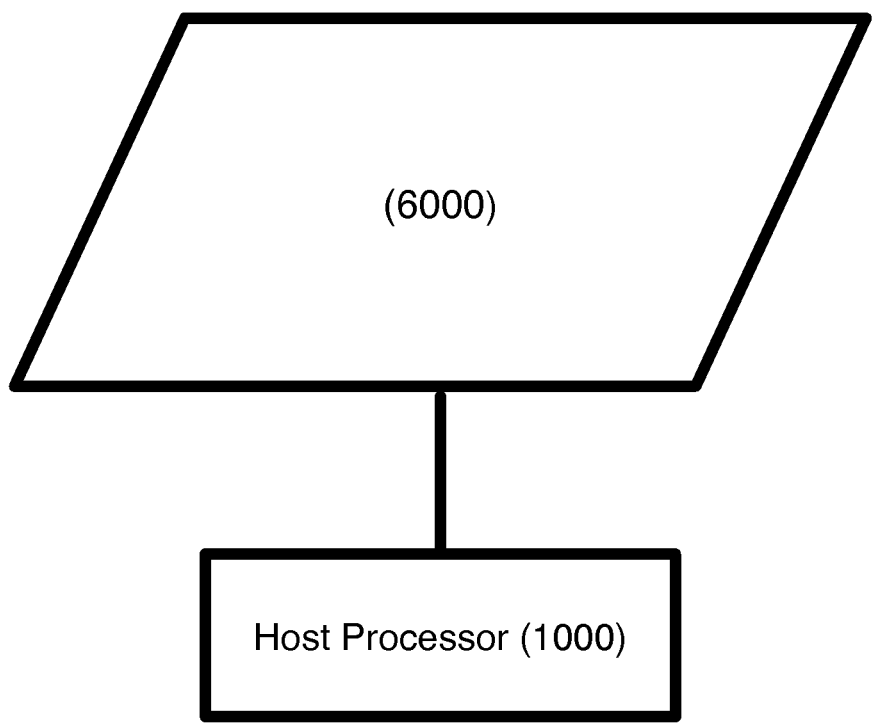
FIG. 1 is system diagram of an antenna element array controlled by a host processor.

A phased-array antenna panel is constructed from building blocks. These are a plurality of front end modules, where circuits and processing unit are embedded locally to process sensitive RF signal, within a main PANEL Printed Circuit Board (PCB). A phased-array antenna allows a highly directive antenna beam to be steered toward a variable target direction in any mobile situation. The direction of the antenna beam is adjusted by resetting the phase shifts of the antenna elements. To enable high mobility, the phase shifts need to be updated quickly. Thus, Applicants' efficient way of dissemination of the phase shift control information to the phase shifters of the antenna elements addresses a long sought need.

Each front end module has a plurality of antenna elements coupled to a frontend amplifier. In an embodiment these amplifiers use Galium Arsenide (GaAs) technology. The frontend die is coupled to a phased-array processing die in an embodiment economically manufactured in CMOS. The antenna elements are embedded in the top of a substrate and the frontend dies and the phased-array processing die are flip-chip mounted onto the bottom or top layer of substrate of each front end module. Input or output signals are conducted through the substrate to the phased-array processing die and to passive combiners and splitters embedded in the PCB; and a transceiver die flip-chip mounted on the PANEL PCB whereby the antenna transmitted and received signals are frequency translated.

The digital signal control and interface circuit has at least one global/individual indicator pad and a plurality of individual die address setting pads enabling a first die address to be configured at a first location on the PCB which connects a plurality of die address pads to a first combination of logic high or logic low and a second die address to be configured at a second location on the PCB which connects a plurality of die address pads to a second combination of logic high or logic low whereby registers within the RFIC are assigned unique addresses.

Tying the front end modules together is a PCB comprising a data and address bus; a plurality of die address pads; a global die selection pad and a transfer format mode pad. In order to scale, a driver is disclosed in an embodiment, which buffers the bus output; the bus coupling a microcontroller master device and coupling a plurality of slave devices on each RFIC.

The method of operation for the apparatus includes several alternatives for controlling slave RFIC devices in an antenna array. These include initializing common registers with calibrated gain values; storing phase shifter values in local registers; computing phase shifter values; and looking up gain settings.

To illustrate the scheme, consider an exemplary submodule of 4×4 elements using 4 bit phase shifters for a planar array in two dimensions. The extension to three dimensional array is conceptually straightforward for those well versed in the art of phased array design. The extension from Cartesian to Spherical Coordinate for the element layout is also routine. For the purpose of simplicity we use the planar example.

The phase increments required for pointing are $\Delta x$ and $\Delta y$. Let the phase of element (0,0) be $\phi_{00}$. Then $$\phi_{xy} = \phi_{00} + x \cdot \Delta x + y \cdot \Delta y.$$

Multiplying a phase increment by an integer may be expensive in one technology and less significant in another implementation. The method of the invention is the multiplication of phase increments which have been distributed to the submodules. In one preferred embodiment which avoids literal multiplication by integer, it can be computed recursively:

Compute first row: $\phi_{x+1,0} = \phi_{x0} + \Delta x$ (3 adds)

Compute the next rows: $\phi_{x,y+1} = \phi_{x,y} + \Delta y$ (12 adds)

To avoid quantization errors in the computation, the phases used in computation are represented in finer increments, e.g. 6 bits. The exact number of bits enable embodiments to accommodate different quality requirements. After computation, the phases can be rounded off to lesser resolution.

Advantageously, the non-conventional central controller (digital signal processor) of the phased-array antenna only needs to send the $\phi_{00}$, $\Delta x$, $\Delta y$ to the submodule for each steering direction. In an illustrative embodiment, the number of bits required per submodule is 3×6 bits. The number of additions is 15.

In one embodiment, wherein the number of submodule is large, a large volume of phase control information would need to be disseminated to all the submodules. A non-conventional second level of hierarchy is introduced by this invention to enable massive scaling.

If the submodules are arranged in the planar rectangular grid, each with i, j indices (e.g. 0, 1, 2, 3 . . . ) corresponding to the position in the two orthogonal axes, for the phased-array antenna, the initial phase $\phi_{00}[i,j]$ of the $[i,j]^{th}$ submodule, is computed as follow.

$$\phi_{xy}[i,j] = \phi_{00}[i,j] + x \cdot \Delta x + y \cdot \Delta y.$$

$$\phi_{xy}[i,j] = \phi_{00}[0,0] + i \cdot \Delta x' + j \cdot \Delta y' + x \cdot \Delta x + y \cdot \Delta y.$$

In an embodiment, a set of fixed offsets ($\phi_{fixed\ x,y}[i,j]$) are added to the equation to account for any fixed phase offset (delay) offset for each antenna element in the implementation. And such fixed offsets do not need to be updated every time and the $\phi_{00}[0,0]$ value can be absorbed into $\phi_{fixed\ x,y}[ij]$.

$$\phi_{xy}[i,j] = \phi_{fixed\ x,y}[i,j] + i \cdot \Delta x' + j \cdot \Delta y' + x \cdot \Delta x + y \cdot \Delta y.$$

The principle of operation of the invention is to multiply a phase increment by an integer. Embodiments of the invention may be more expensive in some technologies than in other embodiments of the invention. In one preferred embodiment which avoids use of a multiplier circuit, phase increment is computed recursively:

Computing first row: $\phi_{00}[i+1,0]=\phi_{00}[i,0]+\Delta x'$

Computing the next rows: $\phi_{0,0}[i,j+1]=\phi_{0,0}[i,j]+\Delta y'$

Because the antenna steering remains unchanged if the phase shifts of all antenna elements are added the same amount of phase shift, the initial phase $\phi_{00}[0,0]$ can be set to zero. Therefore, the phase control information, $\Delta x$, $\Delta y$, $\Delta x'$, $\Delta y'$, to be disseminated to all the submodules is independent of the number of submodules. This bears emphasis and elaboration. Even if the number of submodules is 1024 or 512 instead of 16, there are only four operands which need to be disseminated to all of the submodules. The present invention is easily distinguished from conventional phased antenna array control by the substantially lower bandwidth requirement to distribute phase information into the shift circuits. Both lower data rates and higher phase data uploads are accomplished with less cost. The invention reduces bus speed or increases beam direction change rapidity or both.

One preferred embodiment for realizing the indexing of submodules is to provide address pins for the two orthogonal axes. Each address pin would be tied to logic high or logic low based on the indices: i and j.

Referring now to the drawings, an apparatus embodiment of the invention shown in FIG. 1 is a plurality of antenna elements 6000 communicatively coupled to a host processor 1000 whereby phase increments or addresses, positions, or locations within an antenna weight vector table may be distributed to every antenna element, wherein each antenna element comprises a phase shifter and gain equalizer coupled to a plurality of local registers which contain an antenna weight vector table.

Figure 2:
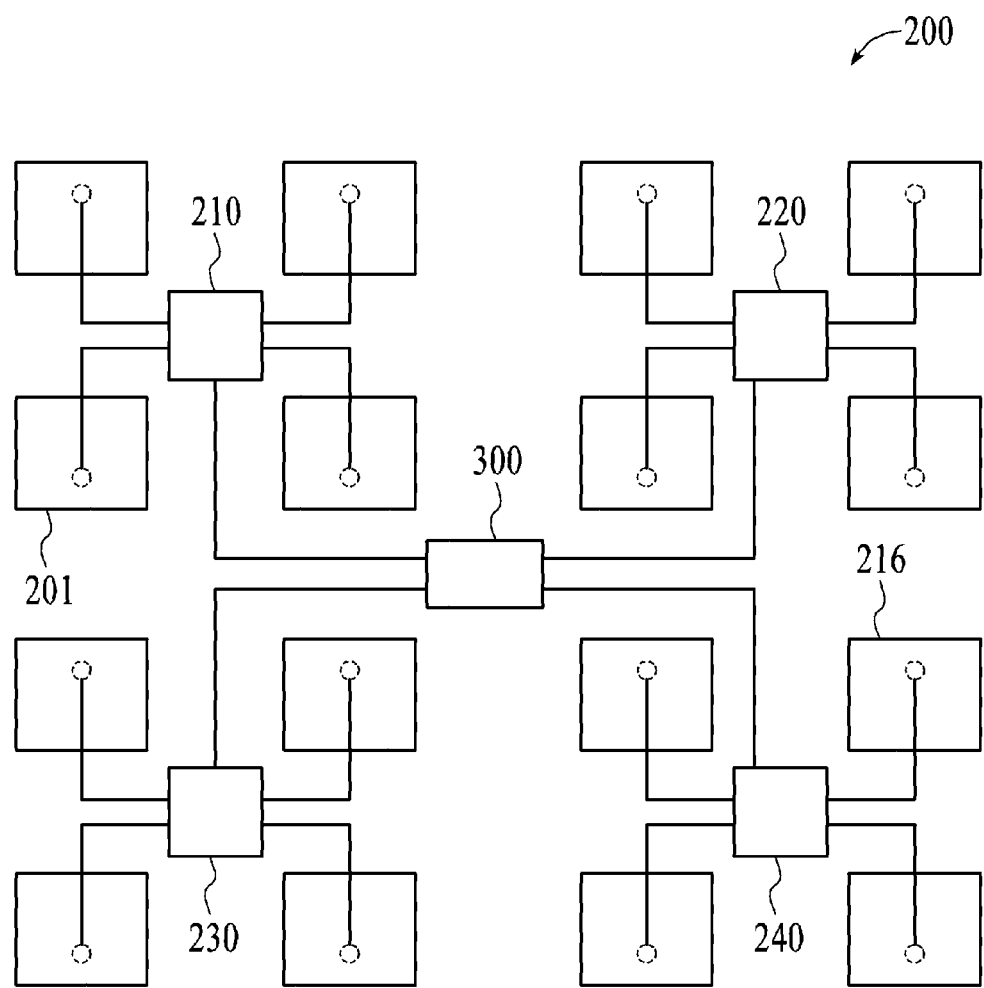
FIG. 2 is an electrical schematic of antenna elements, amplifiers, and a phase control circuit communicatively coupled.

FIG. 2 is an electrical schematic of a plurality of antenna elements 201-216 which are electrically coupled to amplifiers 210-240. Each amplifier is in turn coupled to a phase control circuit 300. In an embodiment, each phased-array processing circuit there are 16 RF chains to process the signals for 16 antenna elements on the front end modules. In an embodiment, the on-chip registers are partitioned into 16 local register groups ad one central register group, whereby the number of digital traces on the die or minimized. Each of the 16 register groups is located in the corresponding RF chains.

Figure 3:
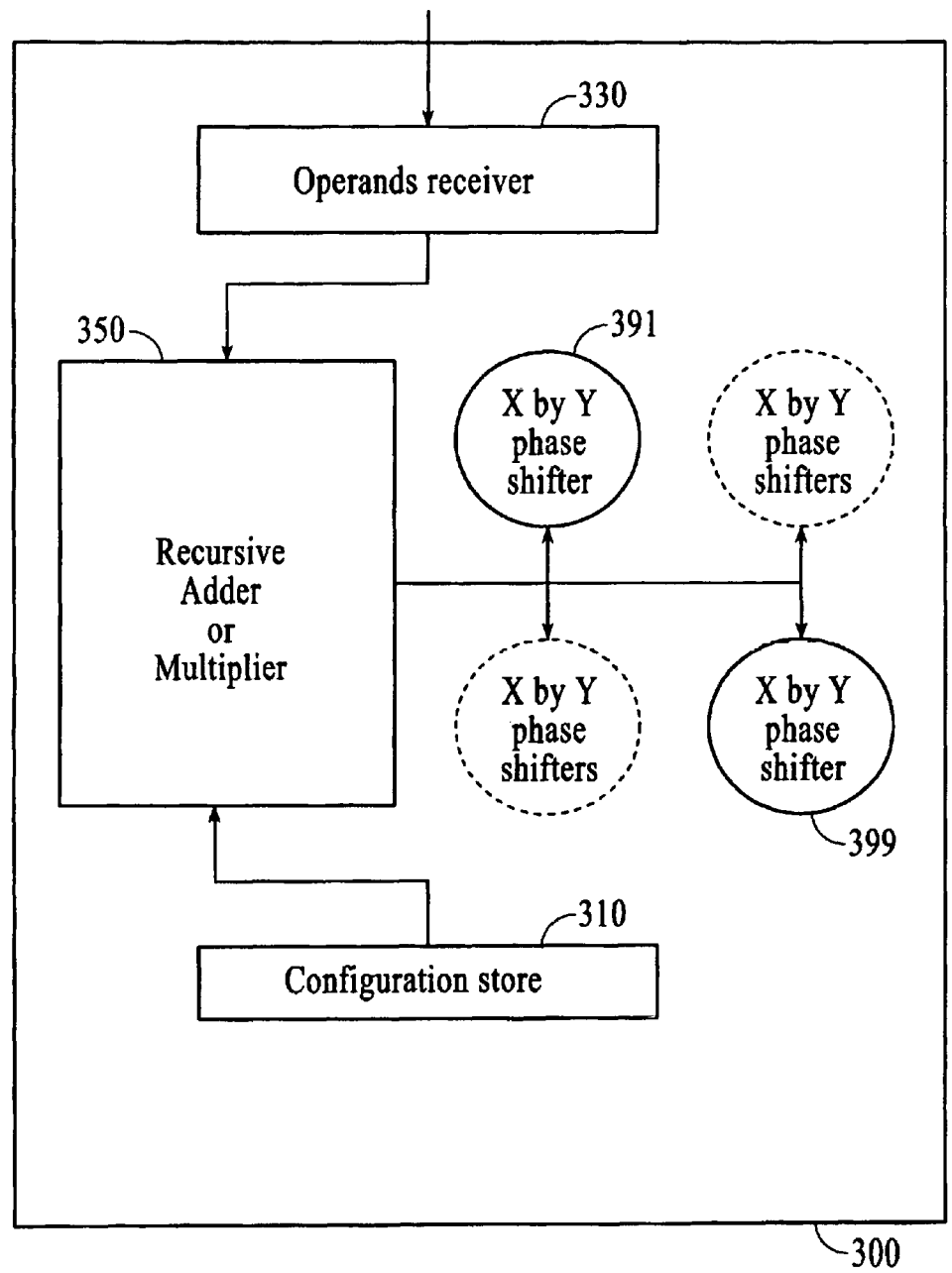
FIG. 3 is a block diagram of a semiconductor device for frequency translation and phase control.

FIG. 3 is a block diagram of a phase control circuit 300. In an embodiment, the semiconductor device has an additional transceiver functionality either from additional radio frequency circuits 370 or reuse of phase control circuits. The phase control circuit apparatus comprises an operands receiver 330 coupled to an antenna weight value function 350 which may be a multiplier or a recursive adder. The antenna weight value function 350 is further communicatively coupled to a configuration store 310. A plurality of X by Y phase shifters 391-399 is further coupled to the antenna weight value function. A plurality of registers receive the results and provide them to the antenna elements.

At minimum the configuration store is no more than the value of i and the value of j representing the position of the subarray phase control submodule within a flat rectangular grid. This may be accomplished by a memory, fuses, or pins tied to logic one or zero. In an embodiment, the configuration store further has a set of correction phase errors for each antenna element or phase shifter.

In an embodiment, a single major operand is the base phase shift for a submodule. In an embodiment, a pair of major operands is received and used in combination with the configuration stored data to determine a base phase shift for the entire submodule. In an embodiment, a pair of minor operands is received and used as phase increments in determining each individual array element's phase shift weight.

Figure 4:
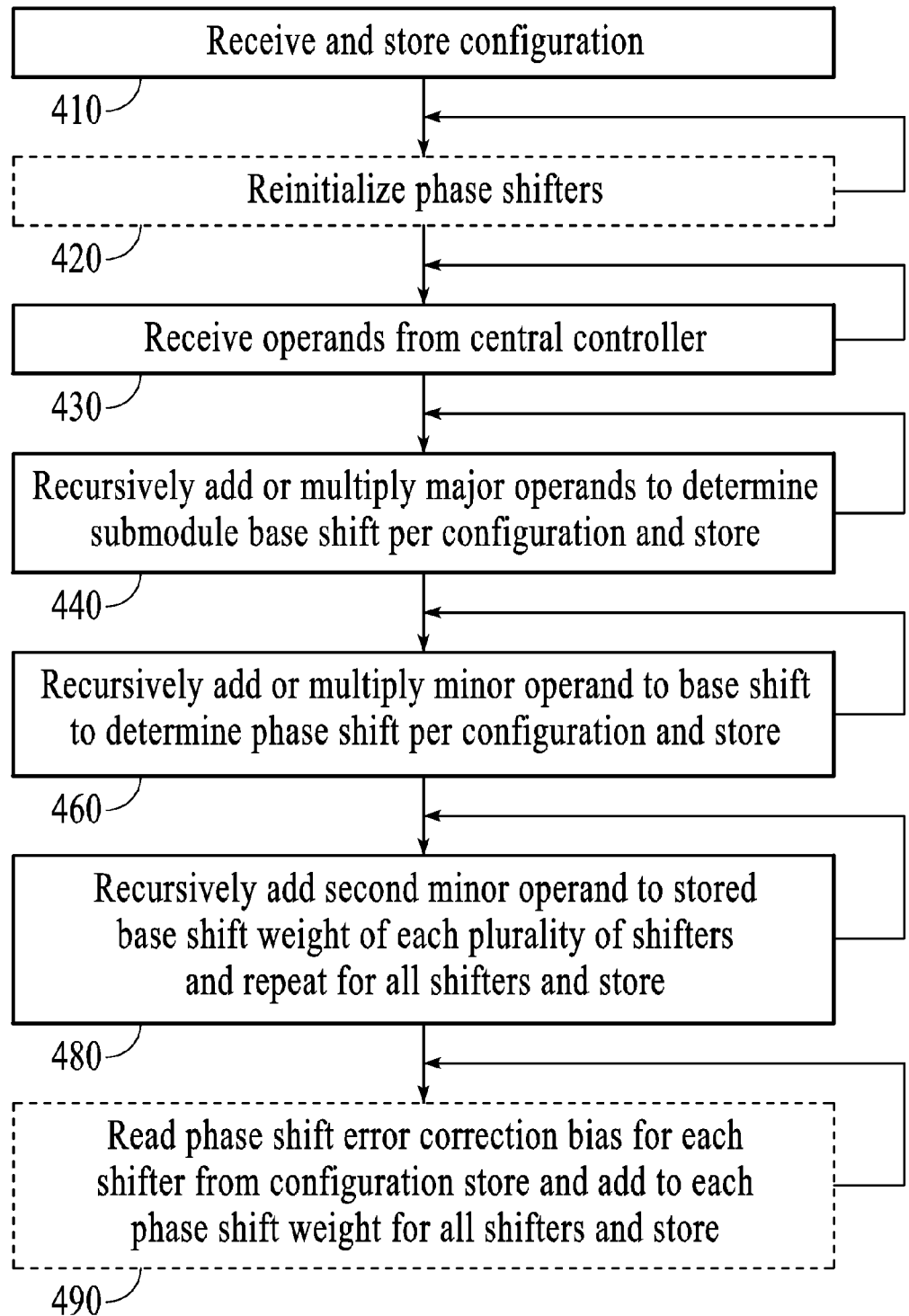
FIG. 4 is a flowchart of method steps to operate a phase control circuit device.

Referring to FIG. 4, a method for operating an exemplary system such as illustrated in FIG. 3 is disclosed. Each submodule receives a plurality of operands from a central controller 430. Advantageously, the disclosed subject matter enables a low cost serial bus to disseminate the phase shift control information. In an embodiment, only four operands are required and may be shared among many submodules. Each submodule has either stored or hardwired a configuration which reflects its unique position within an array. In an embodiment this is a value for i and a value for j within a planar rectangular grid. An alternative embodiment could use a polar coordinate system. Two of the operands distributed to many or all of the submodules are major operands. One or both are recursively added to determine and store a base phase shift for the submodule 440. In an embodiment the number of additions is related to the values of i and j. Thus the determination of the base phase shift for each submodule is done in parallel at the submodule itself and central controller performs a broadcast transmission to many if not all submodules.

Each subarray phase control submodule 300 having determined its own base phase shift, the recursive adder then recursively adds a first minor operand to the base phase shift to determine a phase shift weight for each of a first plurality of shifters and stores the result 460. This can be thought of as determining a phase weight vector for a row (or a column) by adding a phase increment once, twice, or thrice and so forth for index 1, 2, 3, etc.

Each subarray phase control submodule 300 having determined a phase weight vector, the recursive adder then recursively adds a second minor operand to the stored phase shift weight of each plurality of shifters 480. In other words the second phase increment is added once, twice, or thrice to the vector to determine phase shift weights for the full array.

Again, each submodule is operating in parallel with each other submodule and only performing additions. In an embodiment, a multiplier can perform shifting if area and speed are improved but this is an implementation optimization. In an embodiment the major and minor operands may be transmitted separately by the central controller or all in one transmission. In embodiments self-clocking may control computation and storage and in another embodiment a clock.

FIG. 4 is a flowchart of method steps which when executed by a processor or micro controller or a circuit control the directionality of a plurality of antenna elements. Advantageously, configuration values may be distributed to each front end module at each location during non-critical periods. Then during dynamic operation only major and minor operands may be distributed in parallel operations and transformed to determine phase shifts for each antenna element under the control of the circuit.

A method of operation for a phase control circuit comprises receiving and storing configuration data which is distributed to each front end module 410.

In an embodiment, the phase shifters are reinitialized to place into a known state in step 420.

In general the method, once initialized, is started by receiving operands 430 from a central controller. These include both major operands and minor operands.

In step 440, the method includes recursively adding or multiplying major operands to determine submodule base shift per configuration and storing into registers.

In step 480, the method includes recursively adding or multiplying a second minor operand to determine a stored base shift weight of each plurality of shifters. This step is repeated for all shifters and the results stored into registers.

In an embodiment, needed error corrections may be determined in testing or maintenance and stored in configuration store. At step 490, in an embodiment, the method further comprises reading phase shift error correction bias for each shifter from configuration store and adding to each phase shift weight for all shifters and storing the result into registers.

Referring again to FIG. 4, in an embodiment, it may be advantageous to reinitialize the weights of the phase shifters prior to the previously disclosed steps 420. Or it may be sufficient to overwrite selected phase shift weights as each one is determined. In an embodiment, the manufacture and assembly of the antenna array may determine the i and j indexing of each submodule of the array or they may be stored into programmable memory 410. One embodiment for realizing the indexing of submodules is to provide address pins for the two orthogonal axes. Each address pin may be tied to a logic high or logic low based on the indices: i and j. Sockets for the submodules may be soldered into the substrate according to the indices. Even floating gates, wirebonding, switches or jumpers may be a cost effective embodiments. Resistive fuses may be blown to tie address pads for each die to a unique address value at each location on the PCB.

In an embodiment, a phase shift error correction bias is stored into the configuration for each shifter 410. To mitigate phase errors in the implementation, a set of phase shift error correction bias values can be added into a configuration store within each submodule, in an embodiment, during configuration 410. Optionally, in that embodiment, a further process is to read phase shift error correction bas for each shifter from configuration store and to add to each phase shift weight for all shifters and to store 490.

In other words, to compensate the phase errors in the implementation, a set of correction phase errors $\Delta\phi_{xy}$ can be pre-stored inside the registers within the submodules. The correction phase errors $\Delta\phi_{xy}$ can be obtained via calibration procedure in the lab or production process. The phase shift to be applied to each antenna element would be $\Delta\phi_{xy}+\phi_{xy}$. Note that $\Delta\phi_{xy}$ does not change with different steering angles, but could be a function of temperature and other factors.

In an embodiment the apparatus and method is extended into a 3 dimensional phased-array which comprises operands $\Delta x$, $\Delta y$, $\Delta z$, $\Delta x'$, $\Delta y'$, $\Delta z'$.

For clarity of exposition, an illustrative non-limiting embodiment of the subject invention is first provided:

Each antenna element of a phased-array antenna has a local antenna weight vector table which contains phase shifter and gain equalizer values. A beam controller transmits a location, position, or address of a register in which the antenna weight vector table is stored to control each antenna element. The antenna element further has a digital functional logic circuit configured to generate required phase shifts into the registers of each element.

Two possible approaches for setting the phase shifter and gain equalizer values in the RF chain are described first. In approach 1, the phased-array beam is formed by loading each antenna element with specific phase shifter setting value (and gain equalizer setting value) from an antenna weight vector table. The antenna weight vector table contains a set of antenna weight vectors, in an embodiment, sixty-four (64). Each weight vector contains a set of phase shifter settings for all antenna elements. A table of phase shifter settings, (again e.g. 64) is stored in the local registers for each RF circuit chain corresponding to an antenna element. The antenna weight vector table consists of these local phase shifter registers. The values of phase shifter setting are pre-stored in the antenna weight vector table of each die and be used for pointing various beam directions, in this embodiment up to 64, typically, covering the vicinity of a particular beam direction in discretely chosen settings. The resolution of these discretely settings are chosen from system level study. Once the weight table is loaded, the host processor only needs to select which position in the antenna weight vector table to be used for the phase shifters. A specific position within the antenna weight vector table stores the antenna weight corresponding to a beam direction. The preferred embodiment uses a common register to store the address pointer of the position in the antenna weight vector table. The distribution of register addresses (via address pointer) rather than conventional antenna weights improves the antenna beam transition movement speed within the beam directional range covered by the antenna weight vector table. Note that only a single address pointer is disseminated for all the RFIC dies within the phased-array antenna for a beam direction.

However, when the beam direction is outside of the directional range covered by the stored antenna weight vector table, a new antenna weight vector table would need to be loaded. There might be some delay in loading the new table. This is especially true for a phased-array antenna with high number of antenna elements. To enable improved higher mobility, the phase shifts need to be updated quickly. Thus, it can be appreciated that a more efficient dissemination of the phase shift control information to the phase shifters of the antenna elements is needed.

Note that the antenna weight table values can be obtained through calibration of antenna beam in the laboratory. This allows correction of any anomaly in the phase shifter and equalizer values.

We further disclose a second approach for fast loading of the phase shifter setting by employing a plurality of digital functional logic circuits to generate in parallel each required phase shift on-the-fly. In an embodiment wherein the antenna elements are placed linearly in a x and y directional rectangular grid on a plane, the phase shift of the corner element (0,0) is represented as $\phi_{00}$ and the phase increment in the required for x direction and y direction are $\Delta x$ and $\Delta y$, respectively. The phase shift for the $(n_x, n_y)$ element on the rectangular grid can be represented as $$\phi_{xy}=\phi_{00}+n_x\cdot\Delta x+n_y\cdot\Delta y.$$

When the index $(n_x, n_y)$ for the antenna element maps to the address of the registers, the invention provides that only the $\Delta x$ and $\Delta y$ needs to be passed to each digital functional logic circuit to determine the phase shift. Note that the phase shifter setting has limited quantization. So, the actual phase shifter value for each $(n_x, n_y)$ element is $$\text{Quan}[\phi_{xy}]=\text{Quan}[\phi_{00}+n_x\cdot\Delta x+n_y\cdot\Delta y.]$$

Given that in actual silicon implementation, the phase shifter value will need to be corrected by some fixed offset $\Delta n_x, n_y$, the phase shifter value to be used should be $$\text{Quan}[\phi_{xy}]=\text{Quan}[\phi_{00}+n_x\cdot\Delta x+n_y\cdot\Delta y+\Delta n_x, n_y]$$

To generalize the subject matter of the invention, the application discloses two approaches for setting the phase shifter and gain equalizer values in the RF chain. In applicant's approach 1, the phased-array beam is formed by loading each antenna element with specific phase shifter setting value (and gain equalizer setting value) from an antenna weight vector table. The antenna weight vector table contains a set of V antenna weight vectors. In an embodiment, the integer value of V is within the range 16-512. However, as storage densities continue to improve geometrically, the number of antenna weight vectors may be multiplied. Each weight vector contains a set of phase shifter settings for all antenna elements. A table of V phase shifter settings is stored in the local registers for each RF circuit chain corresponding to an antenna element. The antenna weight vector table consists of these local phase shifter registers. The values of phase shifter setting are pre-stored in the antenna weight vector table of each die and be used for pointing up to V beam directions, typically, covering the vicinity of a particular beam direction in discretely chosen settings. The resolution of these discretely settings are chosen from system level study. Once the weight table is loaded, the host processor only needs to select which position in the antenna weight vector table to be used for the phase shifters. The address pointer is used for the selection of position in the antenna weight vector table. Since all the RFIC dies are loaded with the antenna weight vector table corresponding to V beam directions, dissemination of a single address pointer would update the beam direction. This speeds up the antenna beam transition movement within the beam directional range covered by the antenna weight vector table.

However, when a desired beam direction is outside of the directional range covered by the stored antenna weight vector table, new antenna weight vector table values need to be loaded. Any delay in loading the new table, especially for a phased-array antenna with high number of antenna elements will degrade the useful mobility of the antenna. Thus, it can be appreciated that what is needed is a more efficient dissemination of the phase shift control information to the phase shifters of the antenna elements. As mentioned above, the antenna weight table values can be obtained through calibration of antenna beam in the laboratory which allows correction of any anomaly in the phase shifter and equalizer values.

A second general approach for fast loading of the phase shifter setting is to employ a plurality of digital functional logic circuits to generate the required phase shift values in parallel on-the-fly. In an embodiment wherein the antenna elements are placed linearly in an x, y and z orthogonal array the phase shift of the corner element (0,0,0) is represented as $\phi_{000}$ and the phase increment in the required are $\Delta x$, $\Delta y$, and $\Delta z$, respectively. The phase shift for the $(n_x, n_y)$ element on the rectangular grid can be represented as $$\phi_{xyz} = \phi_{000} + n_x \cdot \Delta x + n_y \cdot \Delta y + n_z \cdot \Delta z.$$

The index $(n_x, n_y, n_z)$ for the antenna element reflects the address of the registers. Note that the only the phase increments need be broadcast to every digital functional logic circuit to generate the phase shift. As before, the phase shifter setting has limited quantization and will need to be corrected by some fixed offset in each dimension.

The invention further comprises combining approaches 1 & 2. In a condition when the beam direction is outside of the directional range covered by the antenna weight vector table per approach 2, the new antenna table can be computed via approach 1 to minimize the data transfer requirement between the central controller and the local modules.

A method for operating a phased-array antenna has the steps: receiving from a host processor a position in an antenna weight vector table; reading phase shifter and gain equalizer values from said position in the antenna weight vector table; and pointing a beam by controlling a phase shifter and gain equalizer according to said read values.

An other method for operating a phased-array antenna has the steps: at an antenna element of a phased-array antenna, receiving a phase increment for each orthogonal direction; determining a phase shift for the antenna element according to its index and the phase shift of its corner element; adding a fixed offset to correct the phase shifter value for an anomaly; and storing the phase shift into a position of an antenna weight vector table.

An apparatus embodiment of the invention is a plurality of antenna elements communicatively coupled to a host processor whereby phase increments or addresses, positions, or locations within an antenna weight vector table may be distributed to every antenna element, wherein each antenna element comprises a phase shifter and gain equalizer coupled to a plurality of local registers which contain an antenna weight vector table.

Figure 5A:
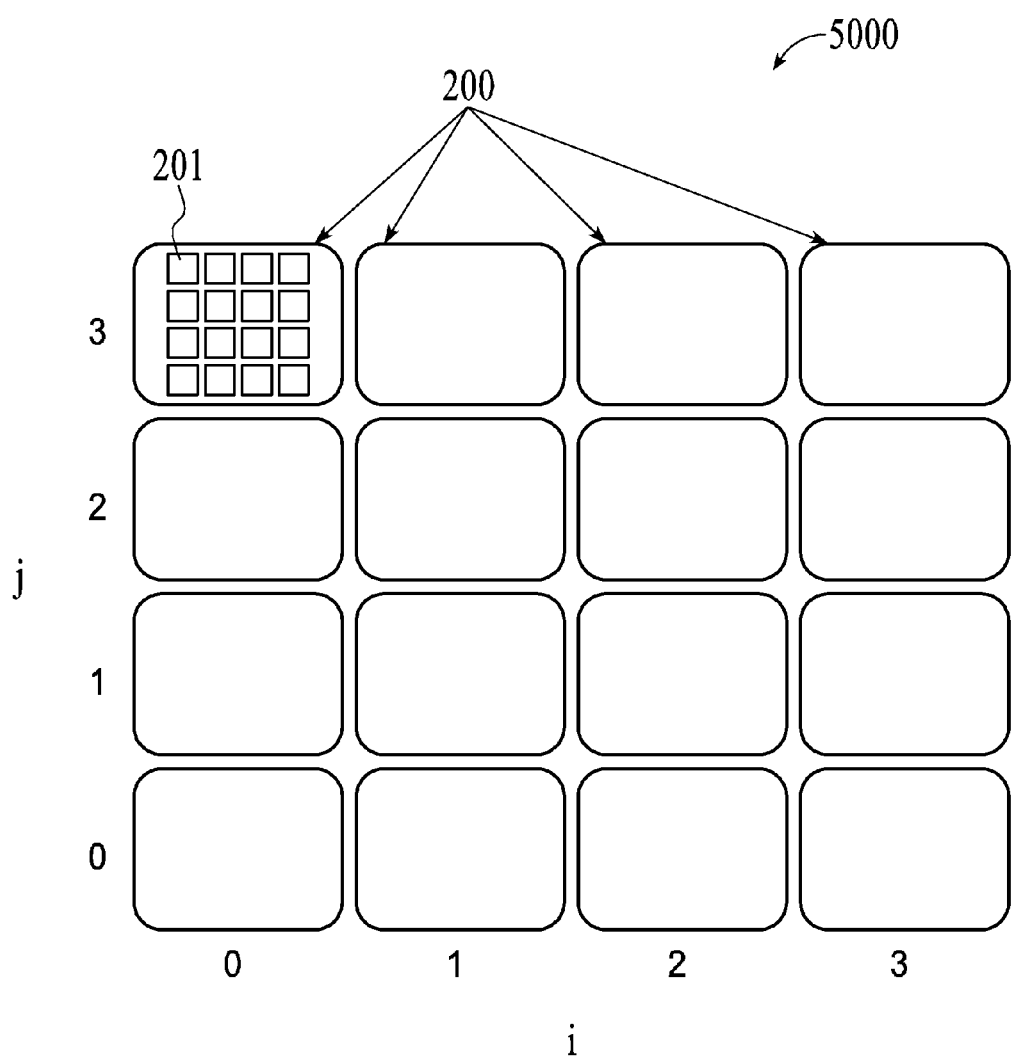
FIG. 5A is a radiating surface view of an array of front end modules mounted on a phased-array antenna panel.

FIG. 5A shows a radiating surface view of a plurality of front end modules 200 of a phased-array antenna panel apparatus 5000. In a detail, the antenna elements 201 . . . embedded in the top few layers of the substrate are illustrated. The antenna elements are electrically coupled through the substrate to amplifiers on the same or opposite surface of the substrate. In an embodiment these amplifiers use Galium Arsenide (GaAs) technology.

Figure 5B:
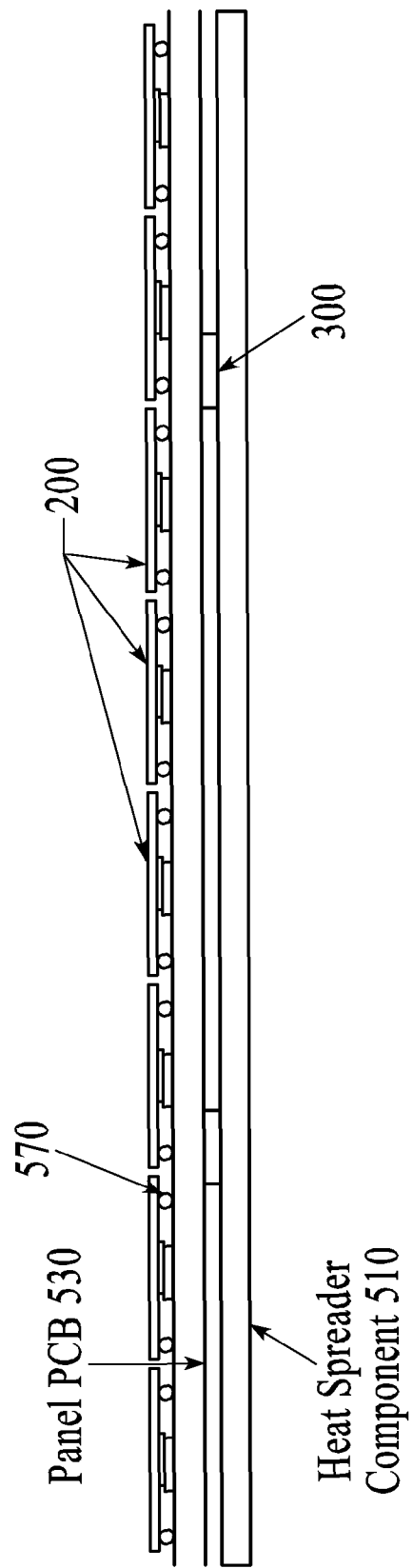
FIG. 5B is an edge or side view of an array of front end modules mounted on a phased-array antenna panel.

FIG. 5B shows an edge or side view of a phased-array antenna panel apparatus 5000. A heat spreader component 510 is mechanically and thermally coupled to a panel printed circuit board (PCB) 530. A transceiver die, 300, flip-chip mounted on the panel PCD, receives signals for transmission and reception. In an embodiment, the transceiver performs frequency translation from Ka-band to L-band, and from L-band to Ka-band. In an embodiment the transceiver die is thermally coupled to the heat spreader component but electrically coupled through the panel PCB to a plurality of signal circuits and to a plurality of front end modules 200. Electrically conductive fasteners 570 in an embodiment solder balls couple each front end module 200 to a unique location on the panel PCB. The presence or absence of electrically conductive fasteners 570 provides address information which uniquely configures each of the front end modules for data reception and transmission on an electrical bus. In an embodiment, the panel PCB provides a connection to ground or to a logic value to provide an address value to each front end modules at each location. A Radio Frequency integrated circuit (RFIC) die consists of phased-array processing blocks which includes phase-shifters, combiners, splitters, gain equalizers, buffer amplifiers, digital signal control and interface circuits. In an embodiment, the RFIC also includes a transceiver to frequency translate from a first band to a second band and from the second band to the first band. In an embodiment the radio frequency amplifiers 210-240 and the phased-array processing dies 300 are flip-chip mounted onto the bottom layer of substrate in the front end module 200.

Figure 6:
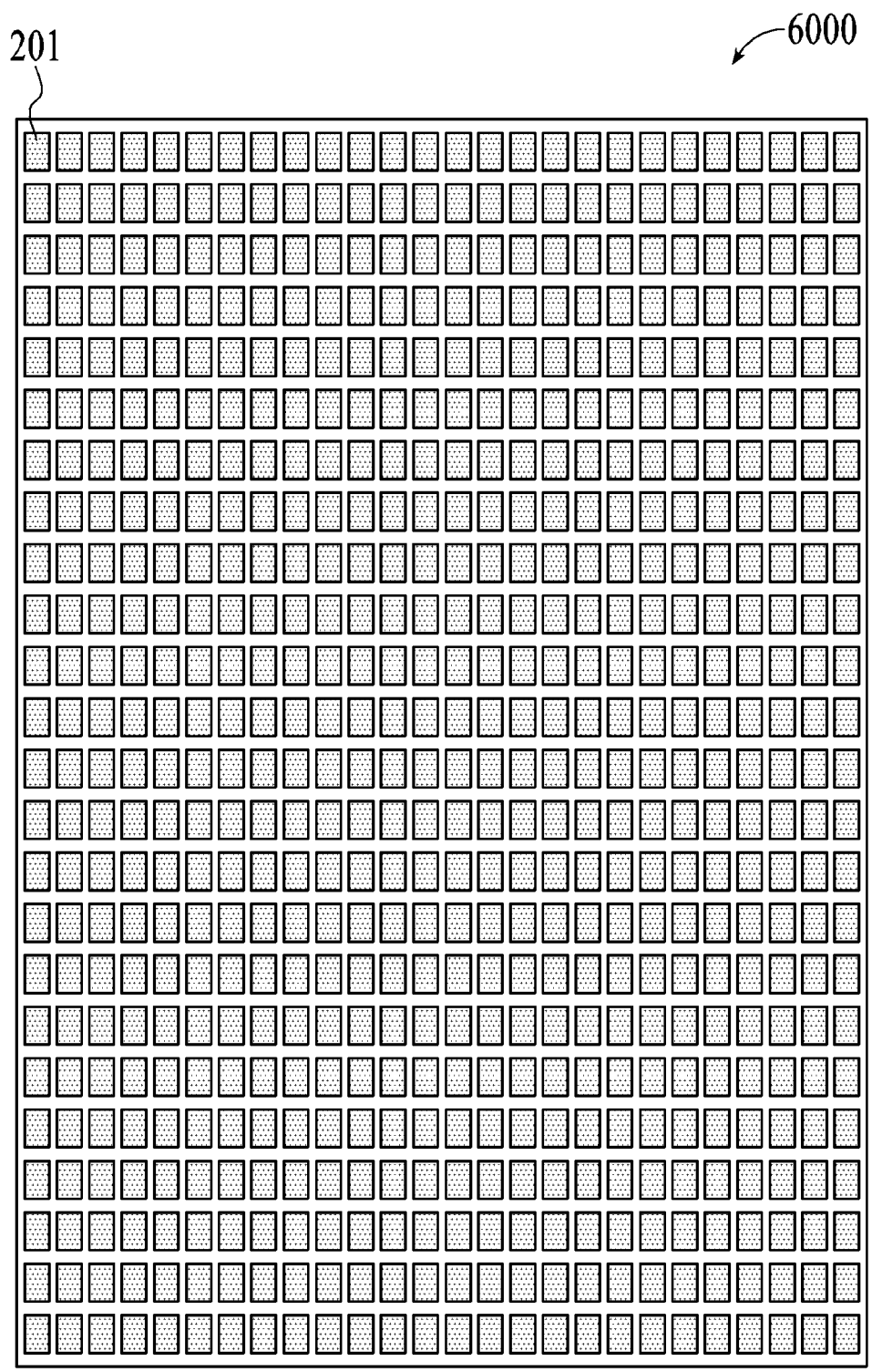
FIG. 6 is a radiating surface view of the antenna elements of a plurality of front end modules mounted on a phased-array antenna panel.

FIG. 6 is one view of an exemplary radiating surface of a phased-array antenna panel 6000 which contain a plurality of antenna elements e.g. 201. One embodiment is a planar Cartesian or x-y arrangement of front end modules. Other embodiments could be a polar coordinate arrangement, or a curved or faceted shape. Other manufacturing considerations may enable square, rectangular, hexagonal, pentagonal, octagonal, or round tiles for the antenna elements. The antenna elements may be disposed in a convex, concave, or parabolic 2d or 3d surface. The surface may be flexible and dynamic because the phase shifting can correct for translation, orientation, and attitude.

Figure 7:
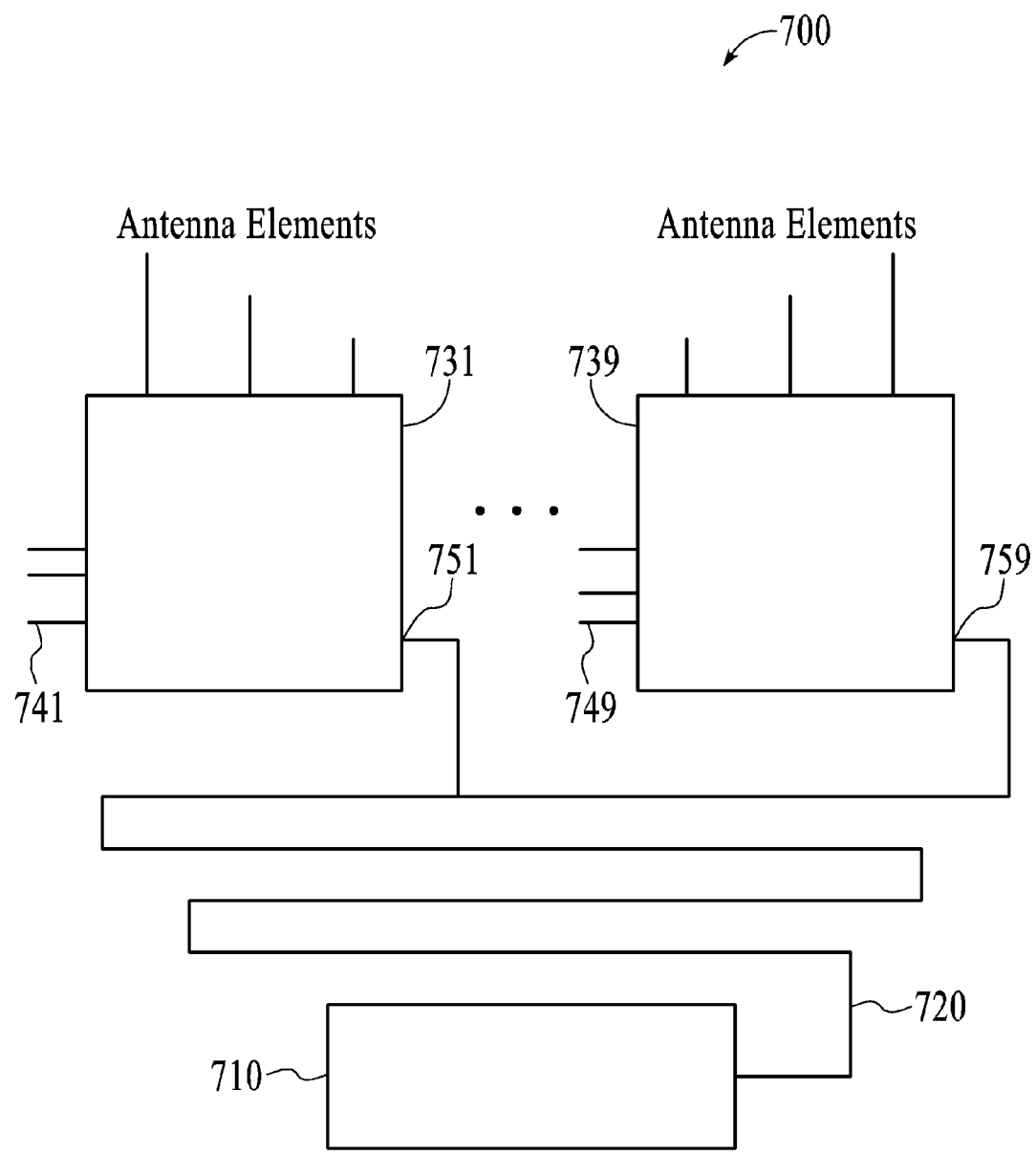
FIG. 7 is a schematic of a plurality of phase control circuit devices electrically coupled via a serial bus to an Antenna Element Array Controller circuit.

FIG. 7 is a schematic diagram 700 of a first Antenna Element Array Controller 710 coupled by at least one First Serial Bus 720 to a plurality of Phased-Array Transformation circuits 731-739. Each of the plurality of Phased-Array Transformation circuits is manufactured with a plurality of die address pads 741-749 which when uniquely bonded to a location on a panel circuit board provides a unique address according to the location (i, j) at which it is bonded. Each of the plurality of Phased-Array Transformation circuits receives Antenna Element Control Values on a serial bus adapter 751-759 coupled to the First Serial Bus. Each of the plurality of Phased-Array Transformation circuits operates on its received Antenna Element Control Values to provide a plurality of Antenna Weight Values which transform the radio frequency signals transmitted from or received by one of a plurality of antenna elements.

FIG. 8 are block diagrams of various embodiments of Phased-Array Transformation (PhAT) circuits which receive parameters from a serial bus and provide Antenna Weight Values (AWR) to elements of an Antenna Element Array. FIG. 8A illustrates a Phased-Array Transformation circuit 800 with a non-transient parameter store 810 in which are antenna weight values which have stored during test, manufacturing, installation, tuning, or off-line maintenance. The Antenna Element Control Value received off the serial bus may be an address in the non-transient parameter store where the antenna weight value to be used is already stored.

Figure 8A:
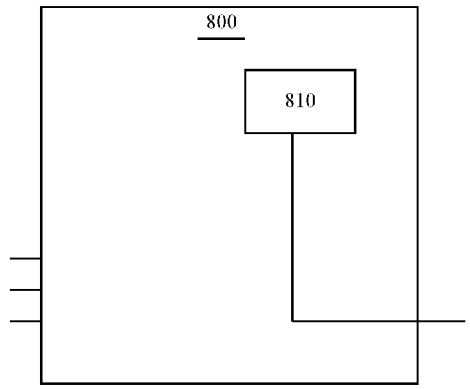
FIG. 8A-D are partial block diagrams of embodiments of a Phased-Array Transformation circuit which can be used as phase control circuit devices highlighting only distinguishing characteristics and not cluttered with repetition of blocks common to all embodiments.
Figure 8B:
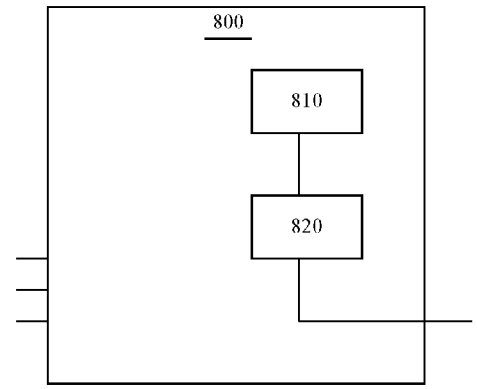

FIG. 8B illustrates a Phased-Array Transformation circuit 800 with a non-transient parameter store 810 and an antenna weight value computation circuit 820. The Antenna Element Control Value received off the serial bus may be operands to determine a base antenna weight of one antenna element and the non-transient parameter store may contain an adjustment for each incremental i and each incremental j of the antenna element array.

Figure 8C:
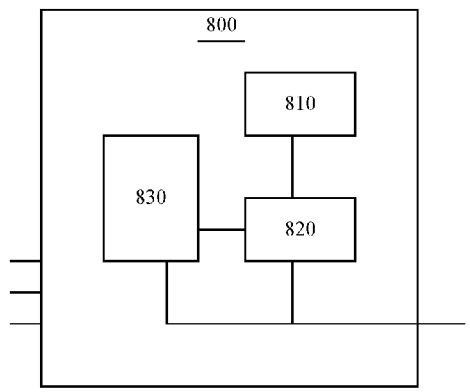

FIG. 8C illustrates a Phased-Array Transformation circuit 800 with a non-transient parameter store 810, an antenna weight value computation circuit 820, and an antenna weight cache store 830. The Antenna Element Control Value received off the serial bus may be an index into the antenna weight cache store for a previously computed set of antenna weights. This embodiment requires that the Antenna Element Array Controller track previously transmitted operands and determine an index into the antenna weight cache store.

Figure 8D:
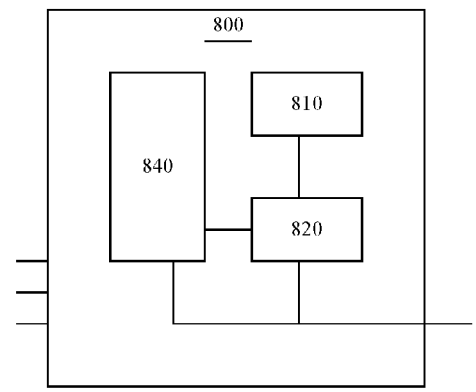

FIG. 8D illustrates a Phased-Array Transformation circuit 800 with a non-transient parameter store 810, an antenna weight value computation circuit 820, an antenna weight store 840 addressable by operand hashes, and a circuit to write to and read from the antenna weight store according to operand hashes.

In an embodiment, the method includes having previously stored the condition that the antenna is currently operating in a given region R, the host processor determines the region that the antenna will be pointing next R+1; the host processor determines that the region is adequately covered by one of the set of d phase weights previously associated with d directions for each element according to a content addressable memory store device wherein the phase weights are computed using the element index and the Submodule index:

For each submodule of 4×4 elements using 4 bit phase shifters, the elements indexed as follows: the phase increments required for pointing are $\Delta x$ and $\Delta y$; set the phase of element (0,0) to be $\phi 00$ and $\phi xy=\phi 00+x\cdot\Delta x+y\cdot\Delta y$; as the submodules are arranged in the planar rectangular grid, each with i, j indices corresponding to the position in the two orthogonal axes, for the phased-array antenna, the initial phase $\phi 00[i,j]$ of the [i,j]th submodule, is computed as $\phi xy[i,j]=\phi 00[i,j]+x\cdot\Delta x+y\cdot\Delta y$ and $\phi xy[i,j]=\phi 00[0,0]+i\cdot\Delta x'+j\cdot\Delta y'+x\cdot\Delta x+y\cdot\Delta y$; the host processor transmits to the Submodules an instruction to load phase weight set d=5 (for example) to the phase shifters on the condition that the phase weight set for direction d has not been overwritten at each submodule.

An apparatus embodiment of the invention further includes a functional digital logic circuit coupled to the phase shifter, the gain equalizer, and the plurality of local registers configured to receive one or more phase increment, determine a phase shift for the antenna element, correct the phase shift by a fixed offset, and store into a location of an antenna weight vector table or load the antenna element with the resulting phase shifter setting value and gain equalizer setting value.

One aspect of the invention is a phased-array antenna panel which contains a number of frontend modules, embedded onto the main PCB (i.e. the PANEL PCB) of the panel. Each frontend module contains a certain number of embedded antenna elements, GaAs frontend dies, and CMOS phased-array processing die(s). The antenna elements are embedded in the top few layers of the substrate and both the GaAs dies and the CMOS die are flip-chip mounted onto the bottom layer of substrate in the frontend module. The input or output signals of the frontend modules can be either actively processed (combining, splitting, and buffering of the received and transmitted signals) with the CMOS phased-array processing dies or passively processed (combining, splitting) with passive combiners and splitters embedded in the PANEL PCB.

Another aspect of the invention is a Radio Frequency Integrated Circuit (RFIC) device which includes: phased-array processing blocks; phase-shifters, combiners, splitters, gain equalizers, buffer amplifiers, and a digital signal control and interface circuit; which interface circuit has at least one global/individual indicator pad and a plurality of individual die address setting pads enabling a first die address to be configured at a first location on the PCB which connects a plurality of die address pads to a first combination of logic high or logic low and a second die address to be configured at a second location on the PCB which connects a plurality of die address pads to a second combination of logic high or logic low whereby registers within the RFIC are assigned unique addresses.

The best mode of the invention has a PCB with a data and address bus, a plurality of address pads, a global selection pad, and a transfer format mode pad.

In an embodiment for improved scaling the apparatus has a driver to buffer the bus output; the bus coupling a microcontroller master device and coupling a plurality of slave devices on each RFIC.

Another aspect of the invention is a method for operation of the invention which offers a plurality of methods including a lookup method for determining antenna element phase and gain settings; a computation method for determining antenna element phase and gain settings.

The method of operation for controlling phase control devices in an antenna array includes: initializing common registers with calibrated gain values; storing phase shifter values in local registers; computing phase shifter values; and looking up gain settings.

In an embodiment the method includes: controlling slave RFIC devices in an antenna array further by: initializing at the same time all common registers within every slave RFIC device in the antenna array to the same calibrated gain values; transferring said calibrated gain values into every instance of local registers for transformation by antenna element specific phase shifter factors; storing antenna element specific phase shifter factorsvalues in local registers; computing phase shifter values; and looking up gain settings.

Finally, a transceiver die, flip-chip mounted on the PANEL PCB, performs the frequency translation from Ka-band to L-band for the receive signal and from L-band to Ka-band for the transmitted signal. Note that all active phased-array processing shall use the same Phased-array Transformation circuit configured with different gain settings.

The PANEL PCB with the attached frontend modules and flip-chip(s) constitute the phased-array antenna panel.

In an embodiment, the digital module includes Digital control interface and registers, Digital functional logic circuit, and Data and Address Bus.

The digital control interface provides the digital interface and the registers. To distinguish among many phase control devices on the Panel, the phase control device has in an embodiment, one global/individual indicator pad and 5 individual die address setting pads for accommodating global or individual die write operation and up to 32 unique device addresses.

While conventional configuration and control of antenna elements are done through registers connected to analog circuits, this would introduce noise, power consumption, and wasted area. In order to scale and to reduce cost and size, each phase control circuit obtains its address as follows. The address for each device is accomplished by using 5 external I/O address pins (pads) in the device which are connected to logic high (VCC) or logic Low (GND) in a unique way in the Panel PCB to set the device address. (Note that the pads are connected to BGA balls on the frontend modules and then connectors to the resistors on PCB.) Depending on how many registers within each die, the registers are assigned unique addresses within the chip. The host processor can access the registers in each CMOS die by writing to or reading from the corresponding unique CMOS die address/register address.

The PCB onto which the modules are mounted provides additional distinguishing characteristics.

Data and Address Bus provides the interface between all RFIC5 and the main processor/microcontroller. Since there are a large number of RFIC5 in the system, the main processor needs to drive a large number of RFIC5.

Figure 9:
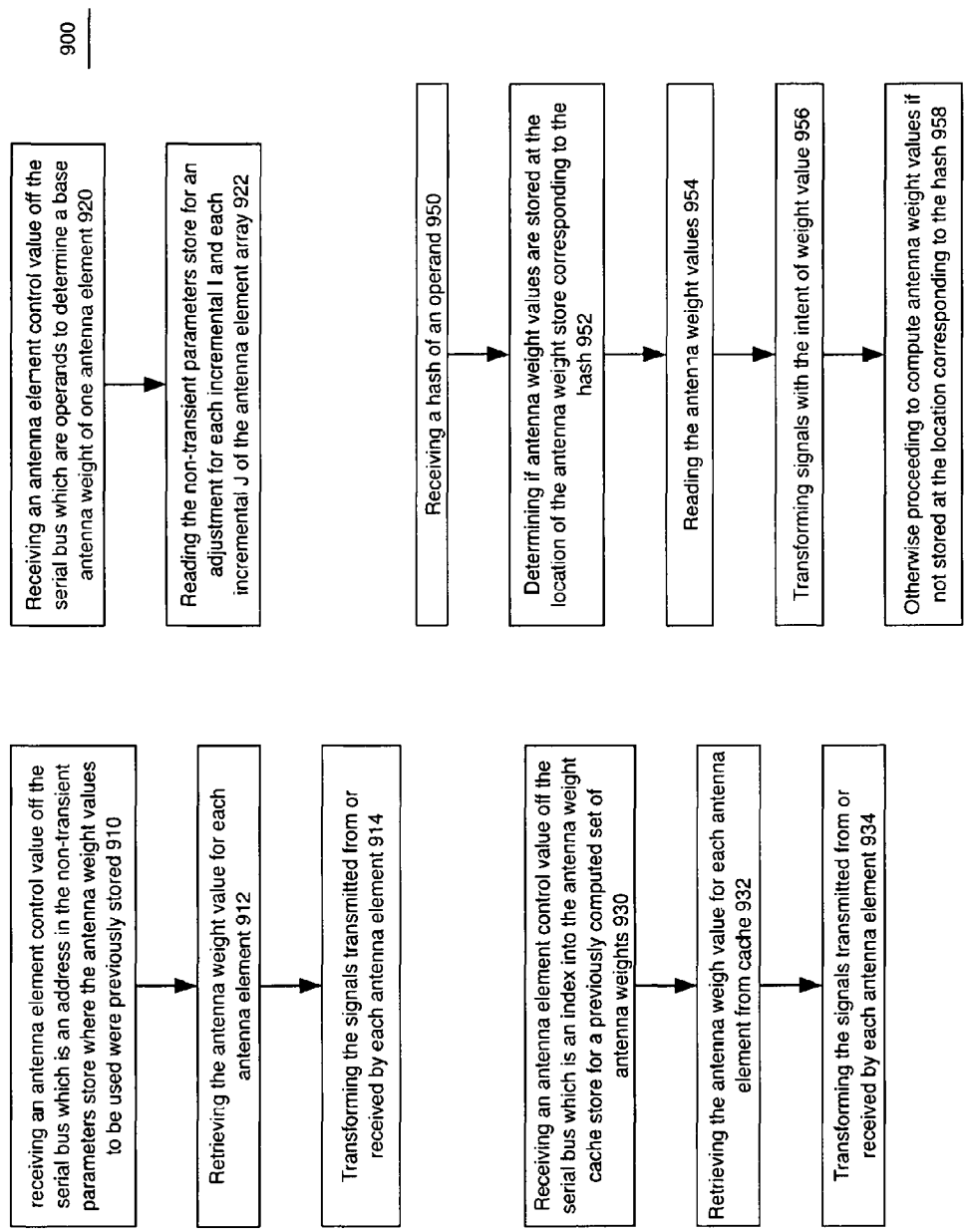
FIG. 9 is a flowchart of a method for control of a Phased Array Transformation circuit.

One aspect of the invention is a method 900 of FIG. 9 for control of a Phased-Array Transformation circuit with a non-transient parameter store in which are antenna weight values which have stored during test, manufacturing, installation, tuning, or off-line maintenance, method comprising for a range of antenna beam directions, receiving an Antenna Element Control Value off the serial bus which is an address in the non-transient parameter store where the antenna weight values to be used were previously stored 910; retrieving the antenna weight value for each antenna element 912; and transforming the signals transmitted from or received by each antenna element 914.

In an embodiment the method further includes, on the condition that a desired beam direction not within the range of beam directions for which antenna weight values were previously stored in the non-transient parameter store, operating the Phased-Array Transformation circuit with an antenna weight value computation circuit by receiving an Antenna Element Control Value off the serial bus which are operands to determine a base antenna weight of one antenna element 920 and reading the non-transient parameter store for an adjustment for each incremental i and each incremental j of the antenna element array 922.

In an embodiment the method further includes operating a Phased-Array Transformation circuit with a non-transient parameter store, an antenna weight value computation circuit, and an antenna weight cache store, on the condition the Antenna Element Array Controller tracks previously transmitted operands and determine an index into the antenna weight cache store, the method comprising receiving an Antenna Element Control Value off the serial bus which is an index into the antenna weight cache store for a previously computed set of antenna weights 930; retrieving the antenna weight value for each antenna element from cache 932; and transforming the signals transmitted from or received by each antenna element 934.

In an embodiment the method further includes operating a Phased-Array Transformation circuit with a non-transient parameter store, an antenna weight value computation circuit, an antenna weight store addressable by operand hashes, and a circuit to write to and read from the antenna weight store according to operand hashes, on the condition that the Antenna Element Array Controller computes and transmits a hash of operands before transmitting the operands, the method comprising: receiving a hash of an operand 950, determining if antenna weight values are stored at the location of the antenna weight store corresponding to the hash 952; reading the antenna weight values 954; transforming signals with the antenna weight value 956; and otherwise proceeding to compute antenna weight values if not stored at the location corresponding to the hash 958.

As is known, there are three formats of SSI bus available on the host processor. For the Freescale SSI formats, the clock polarity bit (SPO) is set to low for the steady (idle) state of logical low on clock line and the phase control bit (SPH) is set to low for the data latching on the first clock edge. As is known to those skilled in the art, the start of transmission is signified by the SSIFss master signal being driven Low, causing slave data to be enabled onto the SSIRx input line of the master. The master SSITx output pad is enabled.

One half SSIClk period later, valid master data is transferred to the SSITx pin. Once both the master and slave data have been set, the SSIClk master clock pin goes High after one additional half SSIClk period. The data is now captured on the rising and propagated on the falling edges of the SSIClk signal.

In the case of a single word transmission, after all bits of the data word have been transferred, the SSIFss line is returned to its idle High state one SSIClk period after the last bit has been captured.

However, in the case of continuous back-to-back transmissions, the SSIFss signal must be pulsed High between each data word transfer because the slave select pin freezes the data in its serial peripheral register and does not allow it to be altered if the SPH bit is clear. Therefore, the master device must raise the SSIFss pin of the slave device between each data transfer to enable the serial peripheral data write. On completion of the continuous transfer, the SSIFss pin is returned to its idle state one SSIClk period after the last bit has been captured.

In embodiments, the SSIClk clock phase from the host process is slightly different in the single transfer mode versus continuous transfer mode. In the continuous transfer mode, the SSIClk clock phase is delayed by half a clock cycle at the beginning of each transfer cycle. So, the SSIClk clock phase is not continuous across the transfer cycles. This format is different from TI synchronous serial format which has continuous SSIClk clock phase and is slightly faster. By this disclosure, Applicant intends illustration of constructive reduction to practice of the invention in either embodiment.

As is known to those skilled in the art, both Freescale and TI formats are designed for full duplex data transfer using FIFO. Unanticipated in conventional practice, Applicants adopt a half-duplex byte read/write format as follows. In the write operation, the first 7 bits are the register address, the 8th bit is the write or read (Write=1, read=0), the last 8 bits are the data byte.

In the read operation, the first 7 bits are the register address, the 8th bit is the read (read=0), the last 8 bits are the data byte. The following timing diagram shows the Freescale format. For TI format, the data is latched at the falling edge.

In an embodiment, a 7 bit address accommodates up to 128 registers. In an embodiment, the on-chip registers are organized in multiple banks of 128 registers. The selection of the register bank is done through setting the RB_CONFIG register. Detailed description will be provided in the later section.

In an embodiment, there are 5-31 external input pads (DIE_ADD) to accept the die address from host processor. If the 5 input matches the die address, the die is selected for read/write operation. An additional input pad (GI_SEL) is used for global or individual die selection. If the global/individual die selection input is high, it is a global setting and all dies shall accept the SSI signal. If the global/individual die selection input is low, only the individual die with die address match shall accept the SSI signal. As shown on the right side of die, the 5 pads are connected to Logic high or Logic low to set the die address. The Freescale/TI pad selects which format to be used. Note that the digital design shall support Freescale frame formats (SPO=0, SPH=0) for both the single or continuous transfer mode and the TI synchronous serial mode.

In a presently preferred embodiment, the apparatus connects serial SSI bus to up to 32 dies in parallel. The parasitics of large number of fan-outs might affect the bus speed. In an embodiment, external line drivers such as 74HTC244 buffer the SPI bus to drive large fan out. Multiple layers of buffering using line drivers might be required. It is advisable to include bus driver and bypass jumper using chip resistor in the final PCB design to enhance the reliability of the design. The decision to include bus driver or not are embodiments.

SPI bus supports the master or slave device. The SPI Master provides the SPI clock and the control of the bus direction. The host processor is the SPI master and all phase control circuits shall be SPI slaves. All phase control circuits will have unique SPI address which is configured through resistors on PCB connected to the I/O pads of the frontend modules. The address of the frontend module will be set according to pre-determined order which allows fast antenna weight vector update. The target SPI bus write speed is 25 MHz when 16 slave dies are connected to a master. The SPI bus speed will be decided after the initial testing. The maximum read speed of SPI bus is 12.5 MHz.

In an embodiment, the candidate microcontroller is TI's ARM Cortex-M4 core based Stellaris processor with maximum speed up to 80 MHz. The LM4F230H5QR contains 4 SPI ports on-chip, each allows up to 8 16 bit values to be stored independently in both transmit and receive modes in the 8-locations deep FIFO. Other microcontrollers are substantially equivalent.

For 48 dies on the Panel PCB, each SPI port can communicate with 12~16 dies. Note that the SPI bus can operate at a maximum of 25 MHz write speed. With 16 bit data registers, the read/write is about 1 MHz.

Write Operation

When host processor writes to the SPI bus, all the dies connected to the same bus simultaneously receive the data. For individual die write (GI_SEL=0), the die with an address match (Die_ADD) shall accept the data into the register. To be precise, when the Die_ADD bits matches the die address (determined by the pad connections), an internal chip select is generated to allow further address decoding and the local register matching the address accepts the data into register.

Read Operation

The host processor reads from the SPI bus. All the data_out pad of the device shall be initially in the high impedance tri-state. Once the first 5 address bit matches the die address, the data_out pad would become active. Once the read operation is complete, the data_out pad would return to high impedance tri-state.

Since the phase control devices contain lots of radio frequency (RF) circuits, it is extremely important to reduce the digital traces going through the device. Parasitic coupling with the RF traces would affect the performance of the RF circuit. Keeping the global digital traces within each phase control to a limited number which go through some pre-planned area only, such as underneath the passive RF combiners (RF combiner only uses the top 2 layers of the metal) of each RF chain is the best mode.

In a preferred embodiment, registers in each phase control circuit are grouped into local registers and central registers, based on where they reside within the die as shown in the diagram where (n=16). The central registers control the overall RFIC functions and the local registers, which are physically placed in close proximity to the local circuit (RF chains) blocks they control. In the phase control circuit, there are multiple RF chains corresponding to the elements of array antenna, each set of the local registers controls the RF circuit chain corresponding to individual antenna element and the set of central registers controls the overall phase control function.

Common Registers

A small subset of local registers, i.e. the common registers, contains identical values for all RF chains. The values of the sets of common registers are duplicated in all RF chains and also in the central area as well. The corresponding common registers are arranged in the same order in all RF chains and the central area. The corresponding common registers in all sets are assigned the same address.

Writing to Common Registers

The corresponding common registers in all sets is written with a single write operation to the die when only one beam is desired. This reduces the time required to configure all corresponding registers to enable high speed system operation. The sole purpose of the common registers is to speed up the write operation. Instead of writing to 16 local non-common registers, a single write would set the 16 corresponding common registers.

Reading from Common Registers

In an embodiment, when the host processor reads a common register address, only one set of physical common register (i.e., global common register set) within the die shall respond to the read operation and output the register value.

All the other sets shall be read-disabled. This avoids the bus contention during read operation of the common registers.

Non-Common Central Register and Non-Common Local Register

In contrast, the set of non-common central registers controlling the centralized circuits are not duplicated in the RF chains. The set of non-common local registers controlling the local circuits and are not duplicated in other RF chains and the central area.

SPI Bus within the Device

By partitioning registers into central and local registers, only a single global data and address bus within a device is required. The address decoders are duplicated in each RF chain. No other traces except for SPI bus shall connect the central registers to a local circuits or local register to a central circuit. This reduces the number of global interconnection traces. Local registers should be placed carefully by the local circuits to minimize crossing of digital traces through RF circuits. As a guideline, the set of local registers and address decoder should be placed on the same relative location of all the local RF circuits so that interconnections can be routed properly. The local and central registers are defined in this specification.

In an embodiment, only 7 address bits are available for accessing registers within the die, accordingly, the registers are grouped to different banks of registers, each bank contains a maximum of 128 registers. At any time, only one bank of register is active. This is configured via the TBD1 bits within a configuration register (RB_CONFIG) within the set of the common registers. At the power up, the RB_CONFIG is defaulted to zero and a default set of bank 0 registers is active. When the TBD1 bits in the RB_CONFIG is set to a value other than zero, a different bank of registers becomes active. This allows the maximum number of addressable registers to be TBD2×128 (where TBD2 is the number of register banks, note that $2^{(TBD1-1)}$ TBD2<$2^{TBD1}$). The address of the RB_CONFIG register shall not be re-used at different banks. Physically, there shall be only one RB-CONFIG register in each set of common registers.

Most of the RFIC functions are controlled by the Digital Control Interface Circuit. Digital Function Logic Circuit will be needed to provide the control of the phase shifter/gain equalizer. Two approaches (Approach 1 and Approach 2) for setting the phase shifter and gain equalizer values in the RF chain are to be implemented. The implementation shall allow independent operation of each approach configured by setting a central register. Each approach should be functional when the digital logics implementing the other approach is removed from the production chip.

In an embodiment, the digital function logic circuit is duplicated in each RF chain.

Approach I (Table Lookup)

In approach 1, the phased-array beam is formed by loading each antenna element with specific phase shifter setting value and gain equalizer setting value from an antenna weight vector table. The antenna weight vector table contains a set of TBD3 antenna weight vectors. Each weight vector contains a set of phase shifter/gain equalizer settings for all antenna elements. A table of TBD3 phase shifter/gain equalizer settings is stored in the local registers for each RF circuit chain corresponding to an antenna element. The antenna weight vector table consists of these local phase shifter/gain equalizer registers. The values of phase shifter setting are pre-stored in the antenna weight vector table of each die and be used for pointing up to TBD3 beam directions. Once the weight table is loaded, the host processor only needs to select which position in the antenna weight vector table to be used for the phase shifters. This should be accomplished by a single write to the die. This speeds up the antenna beam transition movement within the beam directional range covered by the antenna weight vector table. However, when the beam direction is outside of the directional range covered by the antenna weight vector table, new antenna weight vector table need to be loaded. There might be some delay in loading the new table. This is especially true for a phased-array antenna with high number of antenna elements. To enable high mobility, the phase shifts need to be updated quickly. Thus, an efficient way of dissemination of the phase shift control information to the phase shifters of the antenna elements are important. In an embodiment we disclose 2 AWV tables—one table will be used for immediate phase shifter/gain equalizer settings for each RF circuit chain based on the AWV pointer and another AWV table will be used for future phase shifter/gain equalizer settings. The future table can be updated independently of the immediate table. The two tables can then be ping-ponged by an appropriate index.

Note that the antenna weight vector (AWV) table shall be in the local registers. Each AWV contains 16 registers for the 16 RF chains with the same local address (LSB). Note that phase-equalizer values stored inside the registers in RF chain need not be the same. Different values can be loaded into different RF chains to account for any discrepancies of the phase shifter/gain equalizer at different RF chains. The different values are obtained through lab calibration of the phased-array antenna.

Loading Up and Phase Shifter/Gain Equalizer Value

To load up the proper antenna weight within the antenna weight vector, the apparatus provides a pointer for selection of one of the TBD3 registers within the local registers. Note that the pointer resides in a register AWV_POINTER within the common registers. Each time a value is written into the common register, it points to a specific AWV register within the AWV table. Depending on the implementation, the specific register being pointed either directly control the phase and gain equalizer (via a multiplexer controlled by the AWV_POINTER) in one implementation or in an alternate implementation, the value of the specific register is copied onto (read out to) a latch located at the phase shifter/gain equalizer upon each write operation into the AWV_POINTER.

Approach II (Computation)

A second approach for fast loading of the phase shifter setting is to employ digital functional logic circuit to determine the required phase shift on-the-fly. Assuming the antenna elements are placed linearly in a x and y directional rectangular grid on a receiving device. Let the phase shift of the corner element (0,0) be φ00 and the phase increment for x direction and y direction are ΔX and ΔY, respectively, for each frontend module, and phase increment for x direction and y direction are Δx and Δy, respectively, for each element within the frontend module. The phase shift for the (nx, ny) antenna element in the (mx, my) frontend module on the rectangular grid can be represented as $$\phi xy = \phi 00 + mx \cdot \Delta X + my \cdot \Delta Y + nx \cdot \Delta x + ny \cdot \Delta y \qquad \text{(Equation 1)}$$

This allows different frontend module-to-frontend module spacing from the element-to-element spacing within the frontend module. Note that mx, my, ΔX, ΔY, nx, ny, Δx, and Δy are needed in the digital functional logic circuit to generate the phase shift. The nx and ny corresponds to the RF chain index within each transformation circuit. For a transformation circuit controlling 4×4 antenna element, nx and ny takes on the value from the set of [0, 1, 2, 3].

In an embodiment, the phase shifter setting has limited resolution (4 bits). So, the actual phase shifter value for the (mx, my, nx, ny) element is $$\text{Quan}[\phi xy] = \text{Quan}[\phi 00 + mx \cdot \Delta X + my \cdot \Delta Y + nx \cdot \Delta x + ny \cdot \Delta y\neg] \quad \text{(Equation 2)}$$

In an embodiment, the on-the-fly phase shifter value computation is accomplished by digital functional logic circuit. In an embodiment, 8 bits (resolution=360/256 degree) is used to represent the values φ00, ΔX, ΔY, Δx, Δy to yield high precision computation. The computation of Equation 1 is with modulo 8 bit arithmetic in that embodiment.

In an embodiment, the phase shifter value is represented in the fractional value of 360 degree.

| Phase shifter | Fraction | Integer Representation |
|---|---|---|
| 0 degree | 0/360 = 0/16 | 0000 |
| 22.5 degree | 22.5/360 = 1/16 | 0001 |
| 45 degree | 45/360 = 2/16 | 0010 |
| ... | | |
| 337.5 degree | 337.5/360 = 15/16 | 1111 |

In an embodiment, all values are modulo 360 degree, i.e., all integer portion of the fractional representation shall be set to zero after each operation.

The Quan[.] function is used to round-up the resulting arithmetic into the length of phase shifter bits as well as the modulo operation. Mathematically, the following operation is performed by circuits 1. Compute φ00+mx·ΔX+my·ΔY+nx·Δx+ny·Δy¬ using modulo 8 bit integer arithmetic (dropping carry bits)
2. Select 4 MSBs as the phase shifter value Here mx, my, ΔX, ΔY, Δx, and Δy are stored in the common registers. The values of nx and ny are stored in local registers. For each AWV update of the whole phased-array, only ΔX, ΔY, Δx, and Δy are changed. mx, my, nx and ny are written once only during configuration stage.

AWV Setting

In approach 1, to write AWV_POINTER (common register) to multiple dies simultaneously, global write operation (GI_SEL=1) is used. Similarly, in approach 2, when global write operation is used to write ΔX, ΔY, Δx, Δy.

Note that approach 1 or approach 2 is selected via B1 in RB_CONFIG.

Gain Equalization Setting

In an embodiment, the antenna weight table values are obtained through calibration of antenna beam in the laboratory. This allows correction of an anomaly in the phase shifter and equalizer values. Since the gain setting for each phase shifter setting for a given element is based on calibration and do not change (except maybe for large temperature swing), it can be pre-loaded into the RF module during initialization, thereby reducing real time data transfer throughput. For approach 2, there are 16 gain register settings for the 4 bit phase shifter settings. For approach 2, the gain equalizer values shall be stored in a 16 element lookup table (each Gain Equalizer is TBD4 bits), in which the input address is the phase shifter value and output corresponds calibrated gain setting for each phase shift. The 16 registers in the lookup table are local registers.

Quan[φxy]--/-->16×1 Lookup Table→Gain equalizer value

AWV from Approach 2 (Computational Mode)

Method Embodiments

The RFIC digital module is coupled with the PCB microcontroller SPI master via one of the SPI frame format as slave. Each SSI master will control 12 (TBR) slave RFIC digital circuits.

There are 4 modes of system operation:
Mode 1 (Initialization). In this mode the digital module is initialized and the data received by the die will be destined for the Global and Local Registers.
Mode 2 (Read Back). In this mode, the data from the Global and Local Registers in the die with the die address match is read by the SPI master.
Mode 3 (Table Execute). In this mode, the phase shifter/gain equalizer index is received by the AWV_POINTER register.
Mode 4 (Compute). In this mode, ΔX, ΔY, Δx, and Δy needed for Approach 2 are received by the Digital Module.

Initialization

The digital module accepts the data from the microcontroller and load into the local common registers of appropriate antenna elements the calibrated gain values.

Read Back Mode

Upon command by the SPI master, the Digital Module sends the contents of all registers to the SPI master.

Tabulation Mode

The tabulation mode embodiment is set by the B1 bit of RB_CONFIG register. The Digital Module shall accept the data from the SPI master and load into the common local registers the phase vector table. Upon command from the SPI master, the Digital Module loads the phase shifter values into the appropriate local registers. The Digital Module looks up the gain settings for the associated phase shifter value into the local registers.

Computation Mode

The computation mode embodiment is set by the B1 bit of RB_CONFIG register. The Digital Module accepts the data from the SPI master and load into the Global and common local registers the constants. The Digital Module computes the phase shifter values per (Equation 2) and load the result into the appropriate local registers. The Digital Module looks up the gain settings for the associated phase shifter value into the local registers.

Phased-array antenna elements are placed linearly in a x and y directional rectangular grid on a receiving device. Let the phase shift of the corner element (0,0) be φ00 and the phase increment for x direction and y direction are ΔX and ΔY, respectively, for each frontend module, and phase increment for x direction and y direction are Δx and Δy, respectively, for each element within the frontend module. This allows different frontend module-to-frontend module spacing from the element-to-element spacing within the frontend module. Note that mx, my, ΔX, ΔY, nx, ny, Δx, and Δy are needed in the digital functional logic circuit to generate the phase shift. The nx and ny are position of antenna element x, y and, in a currently preferred embodiment, has a correspondence to the RF chain index from 0 to 15 within each circuit which controls 4×4 antenna elements within a frontend module. For a circuit controlling 4×4 antenna element, nx and ny takes on the value from the set of [0, 1, 2, 3].

In some implementations, the RF traces for different frontend modules have equal length. In other implementations, the RF traces for different frontend modules have un-equal lengths. Some fixed phase correction factors $\phi X,Y$ are needed in the above equation to compensate for the time delays $\tau X,Y$ introduced by the un-equal trace lengths. Note that these phase correction factors do not change with beam directions. The phase correction factors, however, are proportional to the center frequency of the signal $\phi X,Y=fc*\tau X,Y$. Note that the two phase correction factors due to un-equal trace lengths can be absorbed into a single correction factor $\phi X,Y+\phi x,y=\Delta\phi X,Y,x,y$.

A Quan[.] function is used to round-up the resulting arithmetic into the length of phase shifter bits as well as the modulo operation. In an embodiment, the following operation is performed in parallel at a location advantageously near to each antenna element:

1. Compute $\Delta\phi X,Y,x,y+mx\cdot\Delta X+my\cdot\Delta Y+nx\cdot\Delta x+ny\cdot\Delta y\neg$ using modulo 8 bit integer arithmetic (dropping carry bits)
2. Select 4 MSBs as the phase shifter value A conventional method of implementing the phased array beamsteering is to compute the antenna phase shifts for every individual antenna element in a single processor and distribute the antenna weight vectors (phases and amplitudes) to each frontend module one by one. This would require dissemination of Nx*Ny weight vectors to (Nx*Ny)/16 frontend modules where each frontend module receives 16 antenna weight vectors. Conventional dissemination of weight vectors adds noise to the signal channel and consumes area for routing of parallel buses which are problems rather than solutions.

Note that with the computational mode where the computation of the antenna weight is done locally at each antenna element, the values for mx, my, $\Delta X$, $\Delta Y$, $\Delta x$, and $\Delta y$ are stored in the common registers and the $\Delta\phi X,Y,x,y$, nx and ny are stored in local registers. For each beam direction, only $\Delta X$, $\Delta Y$, $\Delta x$, and $\Delta y$ need to be updated. The values for $\Delta\phi X,Y,x,y$, mx, my, nx and ny are written only once during the initial configuration phase. This is significant reduction from the prior art method of updating which requires Nx*Ny antenna weight vectors to be updated. Note also that there is no need to write $\Delta X$, $\Delta Y$, $\Delta x$, and $\Delta y$ 16 times for each antenna element within a frontend module.

CONCLUSION

The present invention is easily distinguished from conventional phase array antennas by its serial bus coupling the processor to update all the Phase-array transformation circuits at substantially the same time. A central idea of the invention is that when the array element placement on FIG. 6 (both in x and y directions) follows a regular pattern, the operands for step 440 and 460 are the same for all modules (PhAT circuits). The apparatus updates all the phase shifter values by using "global write" to update these two operands to all PhAT circuits substantially simultaneously. Since these two operands are stored in common register in a die, they are accessible to all the RF chains. This allows very fast update of the beam directions (by updating all phase shifter values quickly) by using two global write operations.

Without the subject matter of the present application, conventional systems have to write to all the phase shifters individually. There are about 768 phase shifters in a desired implementation. It would take enormous amount of time to write the 768 phase shifters through serial bus. As a result, the beam direction update would be very slow.

It is a preferred embodiment to deploy a serial bus to reduce noise and to simplify the array implementation. Advantageously, the computation mode leads to faster update (fast beam steering).

A single chip antenna array control submodule is disclosed in the present patent application. The identical chip may be deployed over an antenna array with many elements. Only four operands need to be distributed by the central control no matter how many antenna elements or submodules are configured.

The present invention is easily distinguished from conventional phased antenna array control by the substantially lower bandwidth requirement to distribute phase information into the shift circuits. Both lower data rates and higher phase data uploads are accomplished with less cost. The invention reduces bus speed or increases beam direction change rapidity or both.

The present invention is easily distinguished from conventional systems by the characteristic of the RFIC to have central registers, local registers, and common registers. Central registers are registers which are located in central area controlling function at the central area. For example, the voltage reference source is in the central area which provides voltage reference or current bias to all local area. Local registers are distributed to be physically close to their respective antenna element. When the common registers on each device receives content, it is duplicated to the local registers on the device. In the compute mode of operation, phase is determined based on delta X and delta Y locally using multiplier or recursive adder circuits. We designate two common registers per device for delta X and delta Y which are written to once for each device. The content is then duplicated locally on the same device, in an embodiment, 16 times when there are 16 antenna elements. Advantageously, only a single bus needs to be routed within each semiconductor device which lowers area and routing resource consumption. This hierarchical structure is substantially advantageous over conventional many write operations to local registers. Advantageously, each device has a pin to control global vs individual operations with the effect that 4 write operations can distribute delta X, delta Y, delta'X and delta'Y to all the devices in the array. In the compute mode, the address setting of each die position on the PCB enables indexing. In a tabulate mode of operation, a pointer is distributed across the array by a global write of a pointer to a common register which updates a weight vector in a single write operation.

The present invention is easily distinguished from conventional phased-array antennas by its method for transforming electrical signals by determining antenna weight vectors for a series of beam directions at digital functional logic circuits distributed among RFIC devices adjacent to their associated phased-array antenna element: initializing local registers and common registers with integer-pair values for location of each antenna element in an phased-array antenna and a phase correction factor. For each desired beam direction in the series of beam directions subsequent to initializing local registers and common registers, the method provides reading four binary coded phase shift values from a serial bus; storing the four binary coded phase shift values into common registers on each RFIC device accessible to each digital functional logic circuit associated with one of the phased-array antenna elements. At each digital functional logic circuit associated with one of the phased-array antenna elements, the method enables distributed computation by reading from common registers a pair of binary coded phase shift increment values for each increment in module location on the printed circuit board and a pair of binary coded phase shift increment values for each increment in antenna element location on the module; reading from common registers integer-pair values corresponding to the location of the module on a printed circuit board; reading from common registers a phase correction factor; reading from local registers associated with each digital functional logic circuit integer-pair values corresponding to the coordinate location of its associated phased-array antenna element in the phased-array antenna on a radiating surface of the module; summing the phase correction factor and the multiplication products of the four binary coded phase shift values with their corresponding location specific integer value; setting an antenna phase shift and amplitude weight value for its phased-array antenna element according to a resolution, in an embodiment, 4 bits; and transforming the electrical signal according to the computed weight values. Advantageously, speed is improved, area and cost is reduced, and bandwidth is conserved over conventional systems by initializing local registers and common registers by the following steps: writing integer-pair values for m into common registers where m corresponds to a coordinate location of each module on a printed circuit board, in an embodiment, reading the integer-pair values from tie-up and tie-down circuits at each mounting location on the printed circuit board; writing integer-pair values for n into local registers where n corresponds to a coordinate location of an phased-array antenna element in the phased-array antenna on a radiating surface of the module, in an embodiment, reading the integer-pair values from a location on a mounting surface of the module; and writing a binary coded value, within the range of 4 to 64 bits, in an embodiment 8 bits, for phase correction factor due to unequal trace lengths into local registers, in an embodiment, reading the binary coded value from a non-transitory storage device.

In an embodiment, the phase-array transformation circuit is electrically coupled to a plurality of antenna elements embedded within a substrate. In an embodiment, the serial bus includes bus drivers to provide drive capability. In an embodiments, the processor circuit is a micro-controller and in another embodiment a micro-processor. In an embodiment, the processor circuit has a plurality of serial busses whereby the antenna element array can advantageously control a plurality of antenna beams.

In an embodiment, the phase-array transformation circuit has a first common register for the first operand coupled to a plurality of radio frequency (RF) chains and a second common register for the second operand coupled to the plurality of RF chains whereby weights for each element of the antenna element array controlled by one of the plurality of RF chains is advantageously re-computed after at most two global write commands.

In an embodiment, each radio frequency (RF) chain of the plurality of RF chains transforms the first operand stored into the first common register and the second operand stored into the second common register into a phase weight and an amplitude weight suitable for its associated element of the antenna element array. In an embodiment, the radio frequency (RF) chain has a digital multiplier and in an alternate embodiment, a recursive adder. In an embodiment, the antenna element array advantageously exhibit the antenna elements placed in a regular pattern embedded within a substrate which allows rapid recalculation of the antenna weights with only two global writes.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry. The special purpose logic circuit can incorporate a state machine implementation which provides the required control flow for the operation.

A number of embodiments of the invention have been described. Nevertheless, it will be understood that various modifications may be made without departing from the spirit and scope of the invention. For example, other serial bus protocols may be used. Accordingly, other embodiments are within the scope of the following claims.

We claim:

1. A method for control of a Phased-Array Transformation (PhAT) circuit with a non-transient parameter store in which are antenna weight values which have stored during test, manufacturing, installation, tuning, or off-line maintenance, the method comprising: for a range of antenna beam directions, receiving off a serial bus an Antenna Element Control Value which is an address in the non-transient parameter store where the antenna weight values to be used were previously stored;

retrieving the antenna weight value for each antenna element; and transforming a signal transmitted from or a signal received by each antenna element.

2. The method of claim 1 further comprising, on the condition that a desired beam direction is not within the range of beam directions for which antenna weight values were previously stored in the non-transient parameter store, operating a Phased-Array Transformation circuit with an antenna weight value computation circuit by:

receiving off the serial bus an Antenna Element Control Value which includes operands to determine a base antenna weight of one antenna element; and reading the non-transient parameter store for an adjustment for each incremental i and each incremental j of the antenna element array.

3. The method of claim 2 further comprising operating a Phased-Array Transformation circuit with a non-transient parameter store, an antenna weight value computation circuit, and an antenna weight cache store, on the condition an Antenna Element Array Controller tracks previously transmitted operands and determines an index into the antenna weight cache store, the method comprising:

receiving off the serial bus an Antenna Element Control Value which is an index into the antenna weight cache store for a previously computed set of antenna weights;

retrieving the antenna weight value for each antenna element from cache; and transforming a signal transmitted from or a signal received by each antenna element.

4. The method of claim 2 further comprising operating a Phased-Array Transformation circuit with a non-transient parameter store, an antenna weight value computation circuit, an antenna weight store addressable by operand hashes, and a circuit to write to and read from the antenna weight store according to operand hashes, on the condition that an Antenna Element Array Controller computes and transmits a hash of operands before transmitting the operands, the method comprising:

receiving a hash of an operand;

determining if antenna weight values are stored at the location of the antenna weight store corresponding to the hash;

reading the antenna weight values;

transforming signals with the antenna weight value; and otherwise proceeding to compute and store antenna weight values if not previously stored at the location corresponding to the hash.

* * * * *

UNITED STATES PATENT AND TRADEMARK OFFICE
CERTIFICATE OF CORRECTION

PATENT NO. : 9,813,129 B2  
APPLICATION NO. : 14/106801  
DATED : November 7, 2017  
INVENTOR(S) : Wang et al.

Page 1 of 1

It is certified that error appears in the above-identified patent and that said Letters Patent is hereby corrected as shown below:

On the Title Page

At the second line of the "Inventors" item (72), delete "Chak Chie" and insert -- Chak-Ming Chie --, therefor.

Signed and Sealed this  
Twenty-sixth Day of May, 2020

Andrei Iancu  
*Director of the United States Patent and Trademark Office*